3,430,234
NAVIGATION SYSTEMS USING
EARTH SATELLITES
Thomas Michael Benyon Wright, Stoneham Mall Road,
Brading, Isle of Wight, England
Filed May 3, 1966, Ser. No. 547,232
Claims priority, application Great Britain, May 5, 1965,
18,876/65
U.S. Cl. 343—6            15 Claims
Int. Cl. G01s 9/56

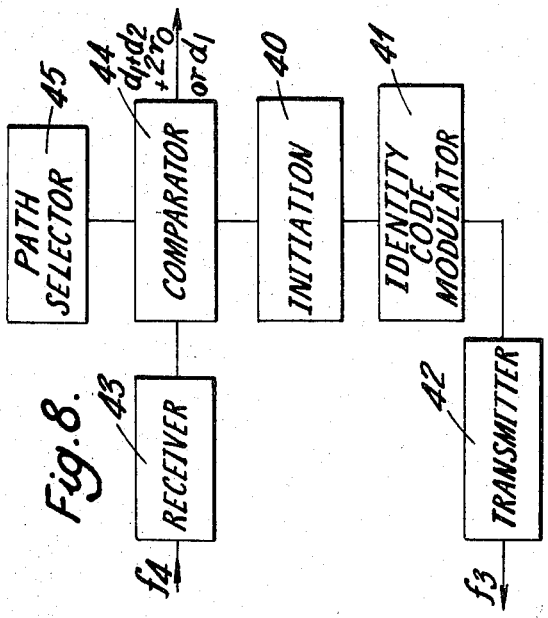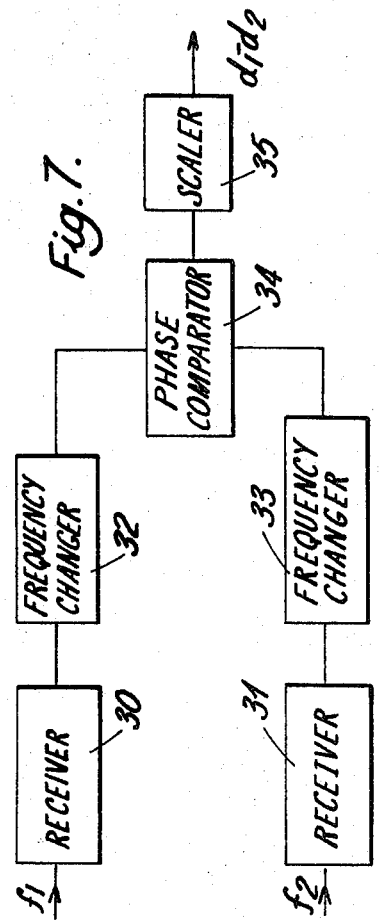

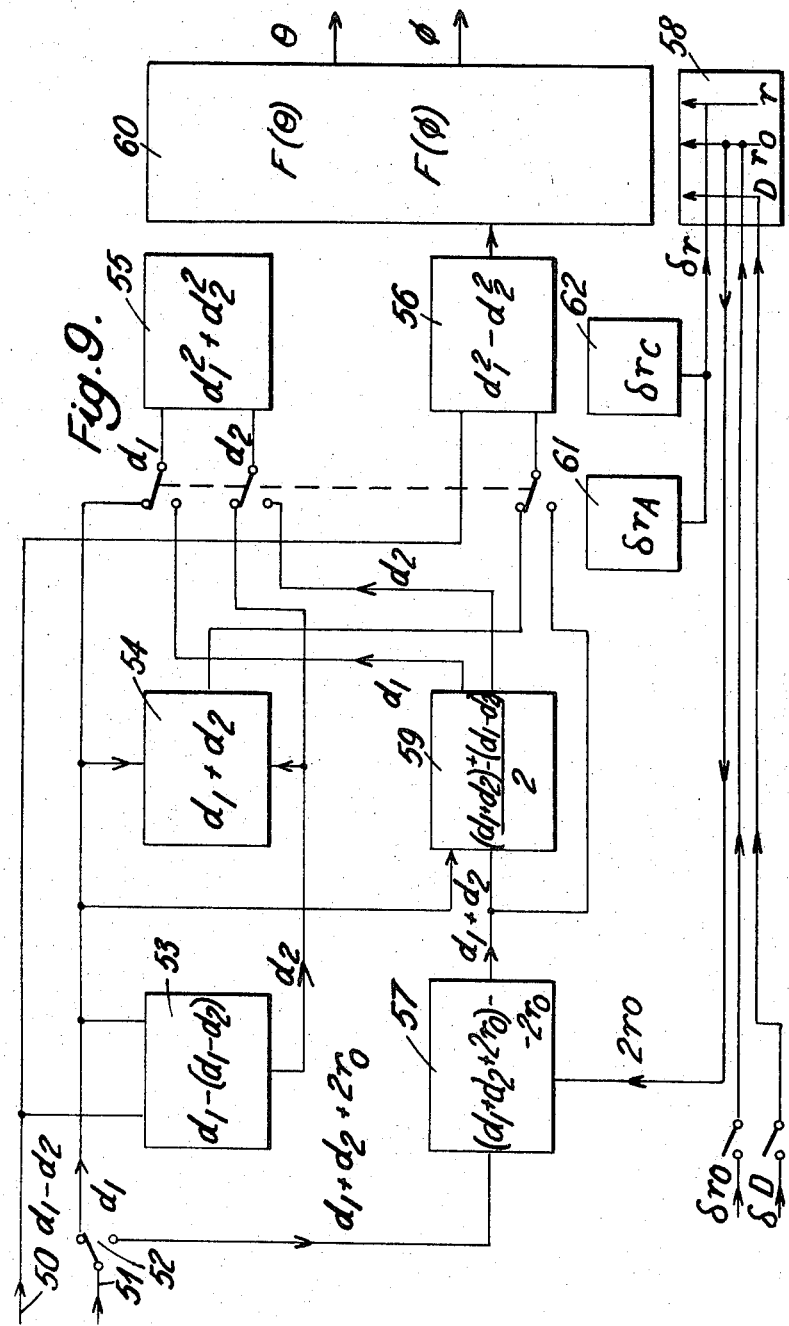

ABSTRACT OF THE DISCLOSURE

A radio navigation system for determining the position of a craft on or over the earth's surface making use of a number of stationary earth satellites. Each satellite has radio receiving apparatus and transmitting apparatus for transmitting signals synchronised with received signals. On the craft, one position line is determined by measuring the time difference between signals received from two satellites while a second position line is determined by measuring the time difference between a signal transmitted from the craft and a signal synchronised therewith received from a satellite.

---

This invention relates to navigation systems for determining the position of a mobile craft on or over the earth's surface.

The invention makes use of stationary earth satellites. It is well known that, by putting a satellite in the appropriate orbit, at a radius approximately 22,752 nautical miles, the satellite will remain stationary over a selected point on the earth's equator. As will be explained later, it is possible to correct for drift of the satellite but, in practice it has been found possible to put up satellites with negligible drift and, in explaining the invention, it is convenient to assume the satellite is stationary. In the following description, reference will be made to radio signals; usually microwave or U.H.F. frequencies would be employed but, in some cases, laser links might be employed. The expression radio is therefore to be understood to include laser frequencies where appropriate. Laser transmission might be used, for example, between two satellites where the transmission path is unaffected by atmospheric conditions.

According to this invention, a radio navigation system for determining the position of a mobile craft on or over the earth's surface comprises a plurality of stationary earth satellites carrying radio receiving apparatus for receiving radio frequency signals and transmitting apparatus for transmitting signals synchronised with received signals and, on said craft, means for determining the time difference between signals from two satellites. Measurement of such a time difference, which can be done to a very high degree of accuracy using present-day phase comparison techniques, enables a single position line to be determined. Conveniently to obtain a second, intersecting position line means are provided for determining the time difference between a signal transmitted from the craft and a signal synchronised therewith received from a satellite.

By measuring the difference of time of transmission of synchronised signals from the two satellites, one determines the position of the craft as being on a position line formed by the intersection of hyperboloid with the earth's surface (or with an appropriate spherical surface above the earth's surface in the case of an aircraft). Present day techniques employed in phase comparison radio navigation systems permit of path difference measurement to a very high degree of accuracy. It may be shown that, using two stationary earth satellites as the transmitting stations, a measurement accuracy to about one part in 4000 is required to give a position line accuracy to one nautical mile on the surface of the earth and this degree of accuracy is well within the capabilities of present-day phase comparison measurement techniques.

It is convenient, in order to get a position fix, to determine one position as described above using the time difference between synchronised transmissions from two satellites, giving thereby a hyperbolic position line and to determine an intersecting elliptical position line by determining the sum of the distances from the two satellites. This technique of determining elliptical position lines is not normally employed in radio navigation systems because of the inaccuracies in the determination when near the base line. This difficulty however does not arise when finding a position line on the earth's surface using artificial satellites as the ends of the base line. The measurement of the sum of the distances is sensitive to displacements in the appropriate direction in the plane containing the craft and the satellites and hence is least accurate at low latitudes since stationary satellites must be in an equatorial plane. It may be shown however that it is possible to achieve an accuracy of one nautical mile in the direction of change of latitude, even at low latitudes, by the timing of pulses using bandwidths of only a few hundred kilocycles per second. The sum of the path distances may be determined by transmitting a signal around the path but, since the difference of the distances $d_1$ and $d_2$ is teterminated as described above, a simple determination of $d_1$ or $d_2$ enables $d_1+d_2$ to be calculated. This matter may be considered in another way: the determination of the distance $d_1$ or $d_2$ gives in effect a circular position line about a point immediately below the satellite whilst the determination of $d_1+d_2$ gives an elliptical position line which is orthogonal to the hyperbolic line determined by $d_1-d_2$.

As will be explained later, since the satellites are in an equatorial orbit, it is readily possible to compute the latitude and longitude. The latitude $\theta$ is given by $$\theta = \arccos\left[\frac{1}{2r}\sqrt{\frac{\Delta^2}{r_o^2} + \frac{(D^2 + r_o^2 + r^2 - \Sigma)^2}{D^2}}\right] \quad (1)$$

and the difference of longitude $\phi$ from the meridian through the point on the earth's surface immediately below the midpoint of the base line between the two satellites is given by $$\phi = \frac{\Delta D}{r_o(D^2 + r_o^2 + r^2 - \Sigma)} \quad (2)$$

where

D is the distance of earth's centre to the midpoint of the baseline between the satellites;
r is distance of vehicle to centre of earth,
$2r_o$ is the distance between two satellites, $$2\Sigma = d_1^2 + d_2^2$$

and $$2\Delta + d_1^2 - d_2^2$$

It will be seen that $r$ is the earth's radius for a surface moving craft but may require a small correction for an aircraft in accordance with the height of the craft. D is a constant dependent on the height of the satellites; stationary satellites must be at a known constant height but there could be minor long term corrections to D if one or both of the satellites should be drifting. $\Delta$ and $\Sigma$ are determined from the time difference measurements made on the craft.

It will be seen therefore that, using this system, a mobile craft can obtain a position fix by means of a relatively simple computer, together with apparatus for determining the time or phase difference between signals from two satellites and distance measuring equipment using a transmitter on the craft interrogating a satellite and for receiving the response therefrom. The transmitting equipment on the craft may be that used for communication using the satellite as a relay, the craft merely having to transmit a distinctive signal, e.g. a pulse, and to determine the time taken before the signal is received back from the satellite.

Six stationary satellites, evenly spaced around the earth in an equatorial plane will enable a craft anywhere in the world, except for small regions near the two poles, to be within the coverage region of two of the satellites and hence to obtain a position fix.

In the following description, reference will be made to the accompanying drawings in which:

FIGURES 7, 8 and 9 are block diagrams illustrating in further detail parts of the apparatus of FIGURE 6.

Figure 1:
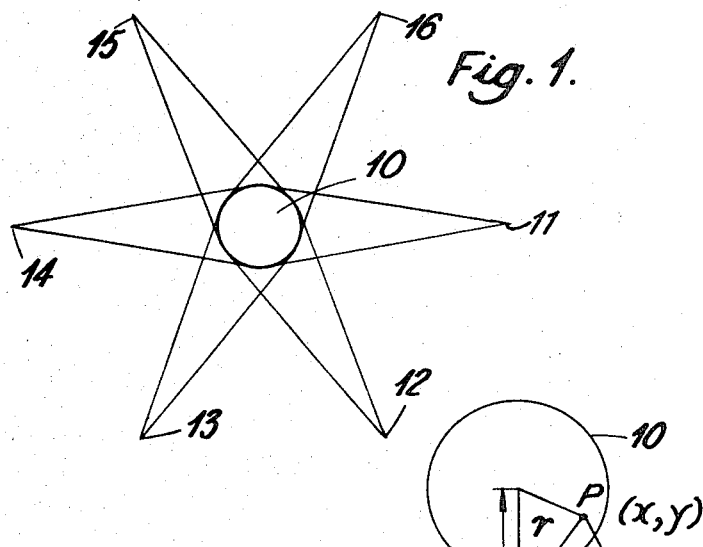
FIGURE 1 is a diagram illustrating the positioning of six satellites in an equatorial plane.

Referring to the accompanying drawings, the particular navigation system to be described makes use of six earth satellites positioned evenly spaced around the earth in an equatorial plane. FIGURE 1 shows the earth 10 with six satellites 11–16. These satellites are stationary satellites, that is to say they are at the appropriate orbial radius (approximately 22,752 nautical miles) such that they will each remain over a fixed point on the earth's surface. It will be seen from FIGURE 1 that, on the equator, all points are within sight of either two or three satellites. More generally, except for small regions around the two poles, all points on the earth's surface are within sight of at least two satellites.

Figure 2:
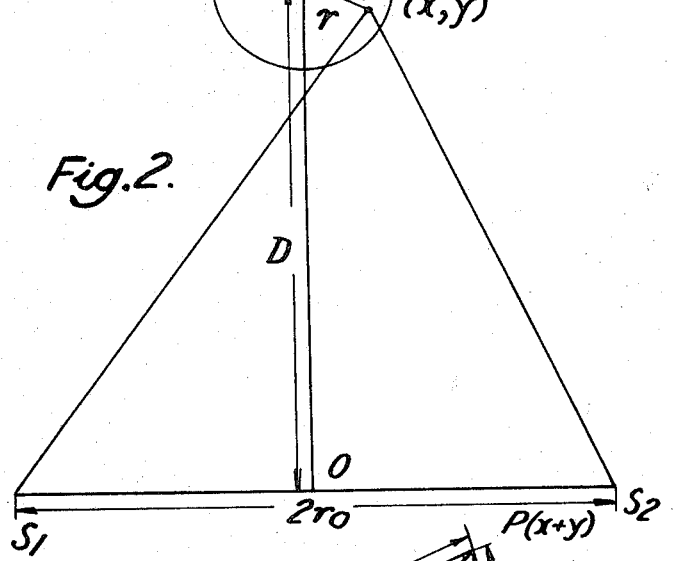
FIGURES 2, 3 and 4 are diagrams for explaining the operation of the navigation system of the invention.
Figure 3:
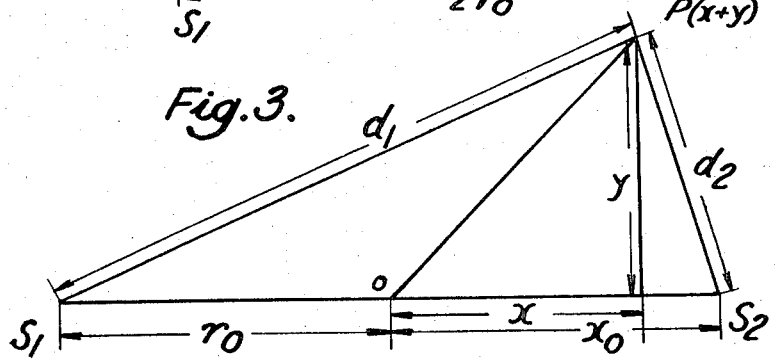
Figure 4:
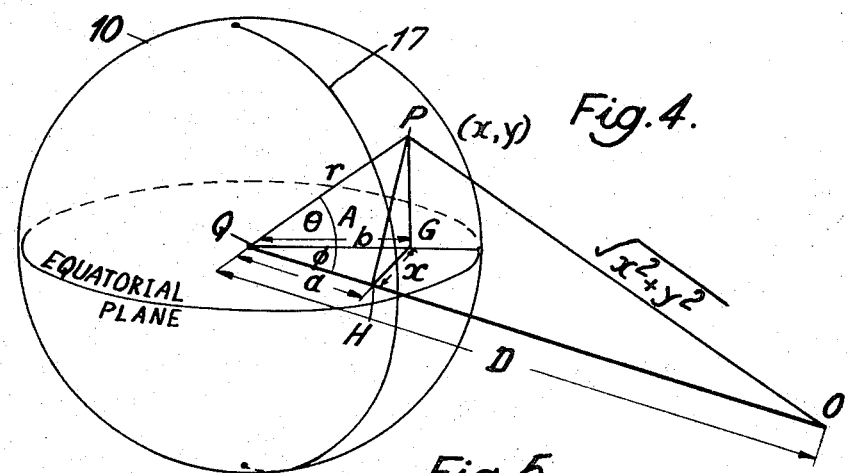

Before describing the apparatus used on the craft and in the satellites, the manner of determining the position of a craft using two stationary satellites will be explained with reference to FIGURES 2, 3 and 4. FIGURE 2 is a view looking down on the earth 10 along a polar axis, showing two satellites $S_1$ and $S_2$ in an equatorial plane. The line $S_1S_2$ between these satellites will be referred to hereinafter as the base line and O, the midpoint of this base line is taken as the origin of a cartesian co-ordinate system, the $x$ axis extending along the base line and the $y$ axis being at right angles thereto. The plane of this co-ordinate system is chosen to pass through the position P of the craft on or above the earth's surface. The distance from O to the centre of the earth is D; the length of the base line $S_1S_2$ is $2r_0$ and the distance from the centre of the earth to the craft P is $r$. For a surface moving craft, $r$ is the radius of the earth. FIGURE 3 is a diagram in the co-ordinate plane showing the positions $S_1$, $S_2$, O and P and illustrating the cartesian co-ordinates $x$ and $y$ of the point P in this co-ordinate system. FIGURE 4 is a perspective diagram, not to scale in that for convenience of illustration the point O is brought closer to the earth's surface, showing the earth with the points P and O. Marked at 17 is a meridian passing through the point on the equator immediately below O, this meridian being the meridian from which difference of longitude $\phi$ of the point P is determined. The latitude of the point P is shown by the angle $\theta$. From P, a perpendicular is dropped to a point G on the equatorial plane. From G a perpendicular is drawn to a point H on the line between O and the centre of the earth Q. The angle between PQ and HQ is shown as A. The distance QH is $a$ and the distance QG is $b$.

It may readily be seen that $$a = r \cos A$$

$$b = \frac{a}{\cos \phi}$$

$$\tan \phi = \frac{x}{a} = \frac{x}{r \cos A} \quad (3)$$

$$\cos \theta = \frac{b}{r} = \frac{\cos A}{\cos \phi} \quad (4)$$

$$\cos A = \frac{D^2 + r^2 - (x^2 + y^2)}{2rD} \quad (5)$$

Referring to FIGURE 3 $PS_1 = d_1$ and $PS_2 = d_2$ $$d_1^2 = y^2 + (r_0 + x)^2 = y^2 + r_0^2 + 2r_0 x + x^2 \quad (6)$$

$$d_2^2 = y^2 + (r_0 - x)^2 = y^2 + r_0^2 - 2r_0 x + x^2 \quad (7)$$

Let $d_1 - d_2 = k_1$ a constant

Subtracting (7) from (6)

$$d_1^2 - d_2^2 = 4r_0 x = (d_1 - d_2)(d_1 + d_2) = k_1(d_1 + d_2) \quad (8)$$

Adding (6) and (7)

$$d_1^2 + d_2^2 = 2(x^2 + y^2 + r_0^2)$$

Now $d_1^2 + d_2^2 = (d_1 + d_2)^2 - 2d_1 d^2$
hence $$2(x^2 + y^2 + r_0^2) = \left[\frac{4r_0 x}{k_1}\right]^2 - 2d_1 d_2 \quad (9)$$

and $$d_1^2 - 2d_1 d^2 + d_2^2 = (d_1 - d_2)^2 = k_1^2$$

$$-2d_1 d_2 = k_1^2 - 2(x^2 + y^2 + r_0^2) \quad (10)$$

hence from (9) and (10)

$$4(x^2 + y^2 + r_0^2) = \left[\frac{4r_0 x}{k_1}\right]^2 + k_1^2$$

or $$x^2 + y^2 + r_0^2 = \frac{4r_0^2}{k_1^2} x^2 + \frac{k_1^2}{4}$$

which re-arranges to $x^2$ $$\frac{\left[\frac{4r_0^2}{k_1^2} - 1\right] - y^2}{r_0^2 - \frac{k_1^2}{4}} = 1 \quad (11)$$

However, from Equation 8

$$d_1 + d_2 = \frac{4r_0 x}{k_1}$$

Thus, Equation 11 becomes $$\frac{\frac{(d_1 + d_2)^2}{4} - (x^2 + y^2)}{r_0^2 - \frac{k_1^2}{4}} = 1 \quad (12)$$

Now $d_1 + d_2$ can be determined by measuring $k_2$, the sum of the sides of the triangle $S_1PS_2$ since, $d_1 + d_2 + 2r_0 = k_2$ hence (12) becomes $$\frac{\frac{1}{4}(k_2 - 2r_0)^2 - (x^2 + y^2)}{r_0^2 - \frac{1}{4}k_1^2} = 1 \quad (13)$$

Thus (11) and (13) provide a pair of equations from which $x$ and $y$ may be determined.

Let $$K_2 = \frac{k_2}{2}; \quad K_1 = \frac{k_1}{2}$$

Then (11) becomes $$\frac{x^2\left[\frac{r_o^2}{K_1^2}-1\right]-y^2}{r_o^2-K_1^2}=1 \quad (14)$$

and (13) becomes $$\frac{(K_2-r_o)^2-(x^2+y^2)}{r_o^2-K_1^2}=1 \quad (15)$$

and solution of (14) and (15) gives $$x=(K_2-r_o)\frac{K_1}{r_o} \quad (16)$$

$$y=\sqrt{\left[\frac{K_1^2}{r_o^2}-1\right]K_2(2r_o-K_2)} \quad (17)$$

and since $$K_1=\frac{ct_1}{2}, \quad K_2=\frac{ct_2}{2}$$

where $t_1$ and $t_2$ are the difference path and sum path transit times respectively, $c$ being the velocity of light, $x$ and $y$ are obtained in the forms $$x=\frac{ct_1}{2R}(ct_2-R) \text{ and } y=\sqrt{\left[\frac{c^2t_1^2}{R^2}-1\right]\frac{ct_2^2}{2}\left(R-\frac{ct_2}{2}\right)}$$

By the substitutions $$S=\frac{d_1+d_2}{2}, \quad D=\frac{d_1-d_2}{2}$$

Equations 11 and 13 take the form $$\frac{x^2}{D^2}-\frac{y^2}{r_o^2-D^2}=1 \quad (18)$$

$$\frac{x^2}{S^2}+\frac{y^2}{S^2-r_o^2}=1 \quad (19)$$

showing that the position P of the craft is determined by the intersection of the hyperbola defined by Equation 18 with the ellipse defined by Equation 19.

The latitude $\theta$ of P and the difference $\phi$ in longitude from the reference meridian can now be obtained using Equations 3, 4 and 5 and it may readily be shown that $$\tan\phi=\frac{\Delta D}{r_o(D^2+r_o^2+r^2-\Sigma)} \quad (20)$$

and $$\cos\theta=\frac{1}{2r}\sqrt{\frac{\Delta^2}{r_o^2}+\frac{(D^2+r_o^2+r^2-\Sigma)^2}{D^2}} \quad (21)$$

whence the expressions for $\theta$ and $\phi$ given by Equations 1 and 2 are directly apparent.

The apparatus on the satellites consists essentially of firstly a relay system to retransmit received signals and, secondly, the transmitter for a phase comparison system whereby the difference of distance of the craft from two satellites may be determined. It is well known for communications satellites to have means for receiving signals at one radio frequency and for retransmitting them on a different frequency and such apparatus may be used for the satellite-carried part of the distance measuring equipment. As previously indicated, the required degree of accuracy can be obtained with short duration pulse signals and employing a bandwidth of only a few hundred kilocycles per second. Microwave frequencies are most conveniently employed for transmission in each direction between the craft and a satellite. If the sum of the distances to two satellites is to be measured, by transmitting from the craft to the first satellite and thence via the second satellite back to the craft, it may be preferred to use a laser link between the two satellites. If the distance from one satellite is measured, it will be noted that since two satellites are always visible and since the distance from only one is required, only three of the six satellites need be equipped with the signal transmitting apparatus.

For the measurement of difference of distances from two satellites, the two satellites are arranged to transmit phase-locked signals of a suitable frequency. The techniques for doing this are well known in the art of phase comparison radio navigation systems. For phase comparison purposes, signals of a relatively low radio frequency can conveniently be compared in phase. Such signals may be transmitted as modulations on microwave signals or may each be synthesised by combining two or more higher frequency signals. Also as is well known, heterodyning techniques may be employed so that low frequency comparison signals may be obtained even although the actual radio transmissions may be at much higher frequencies. Using these known techniques, radio frequency signals of a given frequency are radiated from one satellite and, on an adjacent satellite, means are provided for receiving these signals of said given frequency and for radiating signals phase synchronised therewith, these signals being of a different frequency so that they may be separately received in the craft. It is alternatively possible to synchronise the various satellite transmissions using ground based transmitters or control systems.

Figure 5:
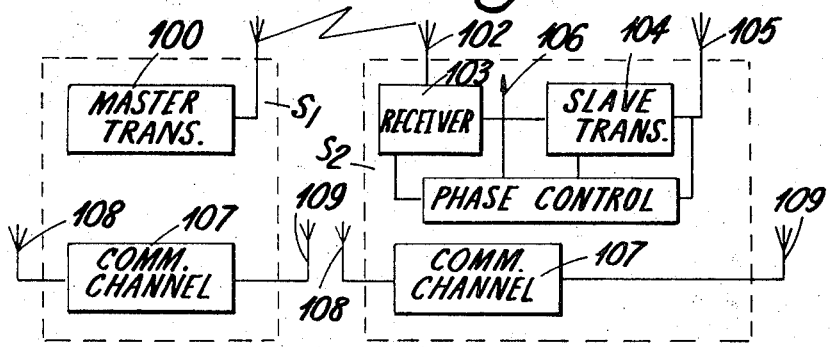
FIGURE 5 is a block diagram illustrating the apparatus on the satellites.

FIGURE 5 is a block diagram illustrating the equipment on the satellites. Shown in the drawing are a first satellite S1 and a second satellite S2. The satellite S1 has a master signal transmitter 100 coupled to an aerial 101 for radiating signals of frequency $f_1$ to be used for the phase comparison path difference measurement. These signals are picked up on the satellite S2 by a receiving aerial 102 and fed to a receiver 103 to provide the input signals to a slave transmitter 104 radiating from an aerial 105 at a frequency $f_2$. A phase control unit 106 compares the phases of the received and radiated signals and feeds a phase lock control signal to the transmitter to maintain the required phase relationship. On each satellite, for the path distance measurement, there is provided a communicaion relay channel 107 with a receiving aerial 108 and a transmitting aerial 109. This relay channel serves to pick up any signals in the frequency band of its receiver and to retransmit them on a different frequency. If signals from one satellite are within the receiving frequency band of another, they will be retransmitted by the second satellite. Thus a ground station, transmitting to one satellite, can receive the signals back from that satellite or from another satellite as requried.

Figure 6:
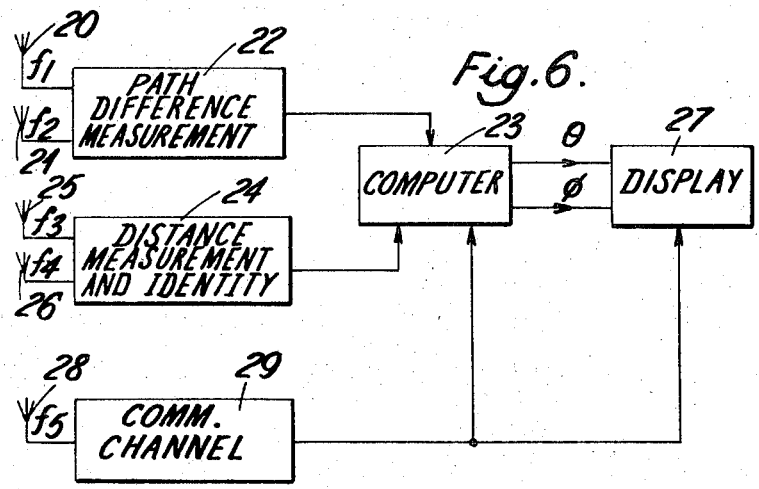
FIGURE 6 is a block diagram illustrating the apparatus carried on a mobile craft.

FIGURE 6 is a block diagram illustrating the equipment on the mobile craft. Signals of frequency $f_1$ and $f_2$ are picked up by aerials 20, 21 and fed to path difference measuring apparatus 22, to be further described later, which apparatus provides an output representative of $d_1-d_2$ which is fed to a computer 23. Distance measuring apparatus 24 transmits a coded identification and interrogating signal via an aerial 25 at a frequency $f_3$ and receives back a response on aerial 26 at a frequency $f_4$. The time delay of this response gives a measure either of $d_1$ or of $d_1+d_2+2r_o$ and this is fed to the computer 23. From this information, the latitude and longitude of the craft are determined and fed to a display 27. If there is any drift of the satellites, the data about this may be determined at a central ground station and relayed by the satellites. On the craft there is provided a further aerial 28 feeding an auxiliary communication channel 29 for picking up this information and feeding to the computer 23 any necessary corrections in D and $r_o$ and for feeding to the display 27 any corrections in the latitude and longitude due to shift of the origin O of the pair of satellites in use. Although four separate receiving aerials and one transmitting aerial are illustrated in FIGURE 5, the various frequencies may all be close together in one frequency band and a common aerial may then be employed.

The apparatus 22 is more fully illustrated in FIGURE 7 and comprises separate receivers 30, 31 for two received signals, frequency changes 32, 33 to bring these signals to a common comparison frequency $f_D$, a phase comparator 34 for comparing the phase of the two comparison signals and a scaler 35. The two signals received by the receivers 30, 31 have to be appropriately numerically related to one another, and also possibly to a reference frequency generated in the craft for effecting frequency changing by mixing, so that the two comparison signals have a phase relationship giving a measure of the difference of distances from the two satellites. As is well known in phase comparison systems, the comparison frequency has to be chosen to give a compromise between the accuracy necessary and ambiguity. If the comparison frequency $f_D$ is 340 kc./s., then the distance between equiphase points on the base line is approximately 480 yards and will be roughly twice this, i.e., about half a mile, on the earth's surface. Since the maximum value of the relevant distance to be measured using any pair of satellites is equal to $r \sin 30°$, i.e., 1720 miles (when $r$ is the earth's radius), then an $f_D$ of 340 kc./s. implies a total of 3440 complete cycles of phase change or "lanes." The scaler 35 is provided to count these lanes. The choice of the radiated frequencies $f_1$ and $f_2$ will depend, apart from the foregoing, on factors such as freedom from interferences, ionospheric attenuation and refraction and consideration of aerial size and angular cover. Typically the frequencies $f_1$ and $f_2$ might range from a few megacycles per second to U.H.F. or the low microwave bands.

The distance measuring apparatus 24 of FIGURE 6 is shown in further detail in FIGURE 8. An initiator 40, which is essentially a switch, when closed either manually or automatically, causes an identity code modulator 41 to modulate a transmitter 42 for transmitting to the satellite a signal, the coding of which identifies the transmitting craft. The form of modulation employed may be either analogue or digital, depending on the type of multiplexing chosen for the overall system. This may be frequency division multiplexing or time division multiplexing or pulse coded multiplexing or noise correlation. The transmitted signal is picked up and retransmitted by a satellite and is received, either directly from that satellite or after relaying via a second satellite, in a receiver 43. From the receiver the signal is fed to a comparator 44 which consists essentially of a store for the craft's identity code and a timing device which measures the time difference between the transmission of the identity code and its reception. The time difference is converted to a digital signal corresponding to either the total path $d_1+d_2+2r_0$ or a single distance $d_1$. Selection of the required output is made by a path selector 45.

The transmitted frequency $f_3$ and the received frequency $f_4$ may be approximately equal or may be widely separated and may each be in the range from a few megacycles up to optical frequencies if lasers are employed (as sometimes might be the case). Most typically however these frequencies would be in the microwave or U.H.F. regions and the choice will be conditioned by propagation and interference considerations and the design requirements for accuracy, capacity and data rate.

When a large number of craft are using the system, their distance measuring (interrogation) signals will in general arrive at the satellite in a random manner, and it is necessary to provide means of ensuring that this does not result in the retransmission circuits in the satellite becoming confused or overloaded. This may be achieved through the application of Time Division Multiplexing by transmitting from one of the satellites an interrogation synchronising signal whose function is to ensure that the interrogation signals are transmitted from each craft in a convenient and pre-determined sequence. Thus, each craft is permitted to perform its distance measurement only during a limited period following the reception of a coded signal by the satellite. The duration of this period is defined not by the transit time for the complete interrogation path as might be first supposed, but by the maximum value of the possible range of variation in this path, and is thus equal to twice the time delay equivalent of an earth's radius, i.e., approximately 32 milliseconds. During this period no other interrogation takes place on the same frequency, but the same interrogation synchronising code from the satellite may be permitted to initiate simultaneous interrogations from craft whose distance measuring channel differ in frequency, and the application of frequency division multiplexing in this manner obviously greatly increases the traffic handling capacity of the system.

Thus in practice, both frequency division multiplexing and time division multiplexing can be applied in the manner described above to provide service to very large numbers of craft, the information renewal rate on any craft being limited by the transit time for the complete interrogation path. For the case of the single satellite method of distance measurement the time delay equivalent to this path is approximately 240 milliseconds, and for the two satellite method approximately 720 milliseconds. Thus, in the first case the maximum information renewal rate is roughly four times per second, and one third of this figure for the longer path. For many types of craft, renewal of position information at very much lower rates than these will be acceptable, and the system capacity can be shared on a pro-rata basis, for example, if a hybrid multiplexing system of the type described above has a capacity equal to a renewal rate on position of four times a second on 10,000 vehicles, this may be apportioned by suitable coding to provide 40,000 vehicles with their position once per second.

The computer 23 of FIGURE 6 is shown in further detail in FIGURE 9. This has a first input at 50 from the path difference measuring equipment 22 giving an input $d_1-d_2$. A second input 51 from the distance measuring equipment 24 is applied to a switch 52 which is set to the upper position in FIGURE 8 when the input is $d_1$ and the lower position when the input is $d_1+d_2+2r_0$. Considering firstly the use of the input $d_1$, this is fed with the input $d_1-d_2$ to a subtracting unit 53 to give an output $d_2$. An adder 54 provides an output $d_1+d_2$. In a unit 55 the value of $d_1^2-d_2^2$ is computed from $d_1$ and $d_2$ whilst, in a unit 56, the value of $d_1^2-d_2^2$ is computed from $d_1-d_2$ and $d_1+d_2$. If the total path input $$d_1+d_2+2r_0$$

is used, this is fed to a subtraction unit 57 where $2r_0$ from a store 58 is subtracted to give $d_1+d_2$. This is fed together with $d_1-d_2$ to an adder and subtractor 59 to give $d_1$ and $d_2$ separately. The values of $d_1$ and $d_2$ are fed to the unit 55 as before whilst $d_1+d_2$ and $d_1-d_2$ are fed to the unit 56.

The outputs from the units 55 and 56 are fed to a computing unit 60 together with the values of $D_1$ $r_0$ and $r$ from the store 58. This unit 60 performs the computations $$\phi = \arctan\left[\frac{\Delta D}{r_0(D^2+r_0^2+r^2-\Sigma)}\right]$$

and $$\theta = \arccos\left[\frac{1}{2r}\sqrt{\frac{\Delta^2}{r_0^2}+\frac{(D^2+r_0^2+r^1-\Sigma)^2}{D^2}}\right]$$

$D$ and $r_0$ are constant if the satellites are stationary. Provision is made however in the computer for feeding in correction $\delta D$ and $\delta r_0$, from the auxiliary communication channel 29 of FIGURE 6, into the store 58 for correcting the values of $D$ and $r_0$. The corrections would be computed at a central earth-based station from measurements of satellite drifts.

For aircraft and other non-surface moving craft, the radial distance $r$ of the vehicle from the earth's centre will vary with the altitude of the craft. For all craft, if the greatest accuracy is to be obtained, account must be taken of the variation of $r$ with position on the earth's surface due to the ellipticity of the earth. Thus a correction $\delta r_A$ must be fed in for aircraft and, if very high accuracy is required, a correction $\delta r_e$ for all craft when the appropriate values of $\theta$ and $\phi$ are obtained by the method of repeated approximation. $\delta r_A$ is obtained from a unit 61 in FIGURE 9; this would conveniently be an altimeter in the case of an aircraft. $\delta r_e$ is obtained from tabulated data stored in a store 62.

The error signals $\delta D$ and $\delta r_o$ permit corrections to the geometry involved in the computation, i.e. to the dimensions of the triangle formed by a pair of satellites and the earth's centre. This ensures that the values of $\theta$ and $\phi$ which are computed, are correct with respect to the line joining the earth's centre to the mid-point of the base line, i.e. O the origin of the aforementioned cartesian coordinate system. It remains however to correct for any motion of O relative to the surface of the earth. This is most conveniently done by computing and transmitting, with $\delta D$ and $\delta r_o$, the latitude and longitude errors $\delta \theta_0$ and $\delta \phi_0$ which are fed, as shown in FIGURE 6, to the display by the auxiliary communication channel 29. It may readily be seen that if satellites S1 and S2 should change in latitude by $\delta \theta_1$ and $\delta \theta_2$ respectively, the mid-point of the base line will change by $$\delta \theta_0 = \frac{\delta \theta_1 + \delta \theta_2}{2}$$

Similarly if they change in longitude by $\delta \phi_1$ and $\delta \phi_2$ respectively, the mid-point of the base line will change by $$\delta \phi_0 = \frac{\delta \phi_1 + \delta \phi_2}{2}$$

The necessary correction to convert the longitude from an angle with reference to meridian under the mid-point of the base line to an angle with reference to the Greenwich meridian may be introduced as a further correction in the display.

The necessity for these corrections may be avoided if the satellite drift is continuously corrected so that the satellites remain on station. It is nevertheless desirable to provide an independent signal whose presence or absence may be interpreted as a warning that a part of the system external to the vehicle has a fault, which might be conveniently indicated by causing the $\theta$ and $\phi$ indicators, when such a warning is obtained, to return to zero. The magnitudes of $\delta \theta_1$, $\delta \phi_1$ etc. may be determined by any of a number of methods, for example by an accurate auto-follow tracking radar or by radar interferometer techniques.

The above described navigation system makes use of a phase comparison technique for determining one position line based on a measurement of difference of distance together with a single measurement of a distance. The phase comparison system requires relatively simple equipment both in the satellite and on the craft and, by using this technique, the two position lines can be determined substantially simultaneously without any requirement for two highly directional aerials on the craft aligned on two satellites as would be necessary if measurement were made separately of the distances from two satellites using distance measuring techniques.

I claim:

1. A radio navigation system for determining the position of a mobile craft on or over the earth's surface comprising at least two stationary earth satellites, at least one of said satellites carrying means for transmitting radio frequency signals, at least another of said satellites carrying radio receiving apparatus for receiving radio frequency signals and transmitting apparatus for transmitting signals synchronised with received signals and, on said craft, means for determining the time difference between signals received from two satellites and means for determining the time difference between a signal transmitted from the craft and a signal synchronised therewith received from a satellite.

2. A radio navigation system as claimed in claim 1 wherein radio frequency signals of a given frequency are radiated from one satellite and wherein at least one other satellite has means for receiving said signals of a given frequency and means for radiating signals phase-synchronised therewith and wherein said craft has means for receiving said signals of a given frequency and said phase-synchronised signals and means for comparing the phases of the received signals.

3. A radio navigation system as claimed in claim 2 wherein the phase-synchronised signals are radiated on a frequency which is harmonically related to said given frequency.

4. A radio navigation system as claimed in claim 1 wherein said time difference determining means on the craft comprises means for measuring the distance from the craft to a satellite by determining the time of transmission of a signal from the craft to the satellite and back to the craft.

5. A radio navigation system as claimed in claim 1 wherein each satellite has radio receiving apparatus for receiving radio frequency signals and transmitting apparatus for transmitting signals synchronised with received signals and wherein said time difference determining means on the craft comprises means for determining the sum of the distances to two satellites by measuring the time of transmission of a signal from the craft to a satellite and thence to a second satellite and back to the craft.

6. A radio navigation system for determining the position of a mobile craft on or over the earth's surface comprising at least two stationary earth satellites, at least one of said satellites carrying means for transmitting radio frequency signals, at least another of said satellites carrying radio receiving apparatus for receiving radio frequency signals and transmitting apparatus for transmitting signals synchronised with received signals and, on the craft, means for determining the time difference between signals received from the two satellites thereby to determine $d_1 - d_2$ where $d_1$ and $d_2$ are the distances of the craft from the two satellites, means for determining the time difference of a signal transmitted from the craft and a signal synchronised therewith received from a satellite and computing means on the craft for computing, from the determined time difference and time of transmission, the values of $\phi$ and $\theta$ where $$\phi = \arctan \left[ \frac{\Delta D}{r_o(D^2 + r_o^2 + r^2 - \Sigma)} \right]$$

and $$\theta = \arccos \left[ \frac{1}{2r} \sqrt{\frac{\Delta^2}{r_o^2} + \frac{(D^2 + r_o^2 + r^2 - \Sigma)^2}{D^2}} \right]$$

where $D$ = distance of earth's centre to midpoint of the base line between the satellites,
$2r_o$ = the distance between the two satellites
$r$ = distance of vehicles to centre of earth
$2\Sigma = d_1^2 + d_2^2$
$2\Delta = d_1^2 - d_2^2$ 7. A radio navigation system as claimed in claim 6 wherein at least six satellites are positioned over the equator so that at least two are visible from any position on the earth's surface except for small regions around the poles.

8. A radio navigation system as claimed in claim 6 wherein means are provided on each satellite for transmitting to the craft correction signals for taking into account, in the computation, any drift of the satellite from an assumed position.

9. A radio navigation system as claimed in claim 8 wherein means are provided on each satellite for transmitting to the craft correction signals for correcting the computation of $\phi$ and $\theta$ for any drift of the satellite from the assumed position.

10. In a mobile craft, radio navigational apparatus comprising means for receiving synchronised radio signals from two stationary earth satellites and for determining the time difference between the reception of the signals thereby determining $d_1-d_2$ where $d_1$ and $d_2$ are the distances of the craft from the two satellites, means for transmitting a signal to one of the satellites and means for determining the time difference between the transmission of that signal and the reception of a signal synchronised therewith from a satellite, and computing means for computing, from the two time differences, the values of $\phi$ and $\theta$ where $$\phi = \text{arc tan}\left[\frac{\Delta D}{r_o(D^2+r_o^2+r^2-\Sigma)}\right]$$

and $\theta = \text{arc cos}\left[\frac{1}{2r}\sqrt{\frac{\Delta^2}{r_o^2}+\frac{(D^2+r_o^2+r^2-\Sigma)^2}{D^2}}\right]$ where $D$ = distance of earth's centre to midpoint of the baseline between the satellites
$2r_o$ = distance between the two satellites
$r$ = distance of vehicle to centre of earth
$2\Sigma = d_1^2+d_2^2$
$2\Delta = d_1^2-d_2^2$ 11. Radio navigation apparatus as claimed in claim 10 wherein means are provided for receiving correction signals representing any changes in the values of D and/or $r_o$ and for feeding appropriate corrections into said computing means.

12. Radio navigational apparatus as claimed in claim 10 and for use on an aircraft or other vehicle above the earth's surface, wherein means are provided for feeding into said computing means information about the height of the craft above the earth's surface for correcting the value of $r$.

13. A radio navigation system as claimed in claim 6 wherein said means for determining the time difference of a signal transmitted from the craft and a signal synchronised therewith received from a satellite comprises time determining means on the craft for determining the time of transmission of a signal from the craft to the satellite and back to the craft, thereby determining $d_1$.

14. A radio navigation system as claimed in claim 6 wherein each satellite has radio receiving apparatus for receiving radio frequency signals and transmitting apparatus for transmitting signals synchronised with received signals and wherein said means on the craft for determining the time difference of a signal transmitted from the craft and a signal synchronised therewith received from a satellite comprises means for determining the time of transmission of a signal to a first satellite and thence to a second satellite and so back to the craft thereby determining $d_1+d_2+2r_o$ where $2r_o$ is the distance between the satellites.

15. A radio navigation system as claimed in claim 6 wherein means are provided on one satellite for transmitting interrogation synchronising signals and wherein, on each craft, there are provided means for receiving the interrogation synchronising signals and means for synchronising said signal transmitted from the craft in accordance with the received synchronising signals.

References Cited

UNITED STATES PATENTS 2,598,290   5/1952   O'Brien _____ 343—105

OTHER REFERENCES

R. E. Anderson, "A Navigation System Using Range Measurements from Satellites with Cooperating Ground Stations," Navigation, vol. II, No. 3, Autumn 1964, pp. 315–334.

RODNEY D. BENNETT, *Primary Txaminer.*

R. E. BERGER, *Assistant Examiner.*

U.S. Cl. X.R.

235—150.271; 343—102, 105